A. V. GULLBORG.
INDICATOR MECHANISM FOR SPRING MOTORS.
APPLICATION FILED JAN. 19, 1918.

1,302,539.

Patented May 6, 1919.
3 SHEETS—SHEET 1.

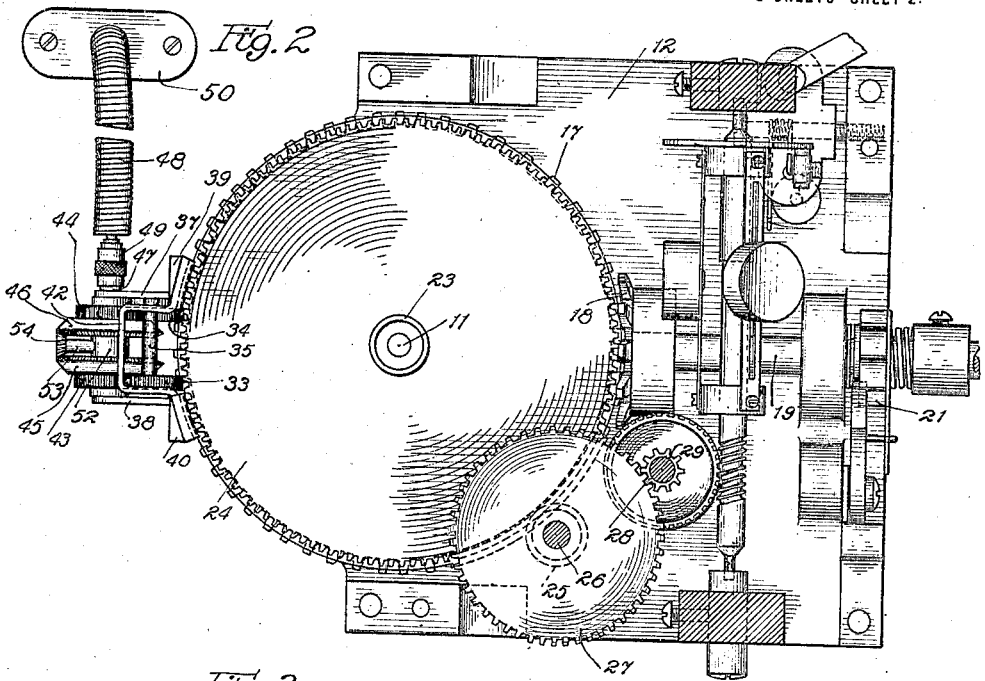

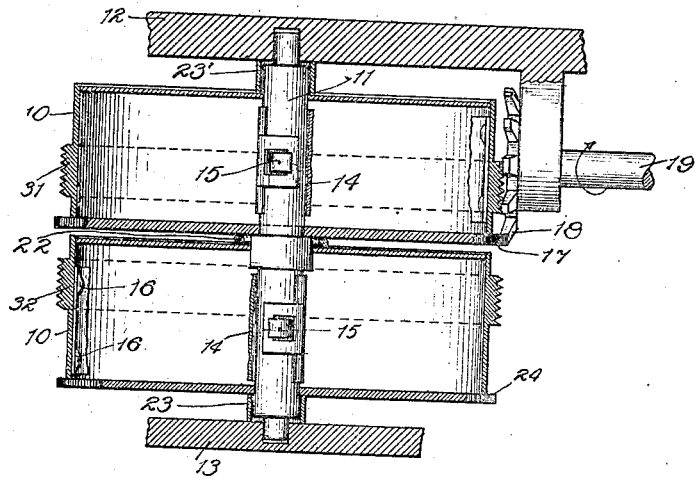
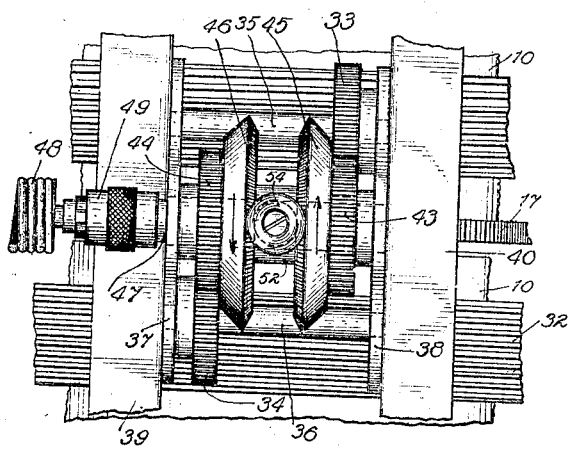

UNITED STATES PATENT OFFICE.

ARTHUR V. GULLBORG, OF CHICAGO, ILLINOIS.

INDICATOR MECHANISM FOR SPRING-MOTORS.

1,302,539. Specification of Letters Patent. Patented May 6, 1919.

Application filed January 19, 1918. Serial No. 212,573.

*To all whom it may concern:*

Be it known that I, ARTHUR V. GULLBORG, a citizen of the United States, residing at Chicago, in the county of Cook and State of Illinois, have invented a certain new and useful Improvement in Indicator-Mechanism for Spring-Motors, of which the following is a full, clear, concise, and exact description, reference being had to the accompanying drawings, forming a part of this specification.

This invention relates to improvements in indicator mechanism for spring motors. The objects of the invention are, first, to provide an improvement over the structure disclosed in the patent of P. Catucci, No. 1,169,317, January 25, 1916, for indicating when a spring of the spring motor is completely wound or unwound, and for indicating any intermediate extent to which the spring is wound; second, to provide a structure of the class referred to in which clutches or similar devices for connecting the indicating means to the spring motor are omitted, thereby simplifying and cheapening the cost of construction of the apparatus. In my improved indicating means the indicator is positively geared to two of the movable parts of the spring motor, one of which parts moves a distance proportional to the extent to which the spring is wound, and the other of which parts moves a distance proportional to the extent to which the spring is unwound, means being provided for differentiating these two movements and communicating the resultant movement to the indicator. Further objects, adaptabilities, and capabilities will appear as the description progresses, reference being had to the accompanying drawings, in which—

Fig. 2 is a bottom view of the motor mechanism and the differential apparatus for controlling the movement of the winding indicator, the bottom bearing plate being removed for the purpose of better illustration;

Fig. 3 is a side elevation of the structure shown in Fig. 2, portions of the apparatus being broken away for the purposes of better illustration;

Fig. 4 is a sectional detail view through the spring barrels of the motor, showing the connection between the springs in the two spring barrels, the portions of the springs intermediate the ends being broken away to permit better illustration of the details of this portion of my structure;

Fig. 5 is an enlarged elevation of portions of the two spring barrels and the differential mechanism.

Similar characters of reference refer to similar parts throughout the several views.

Figure 1:
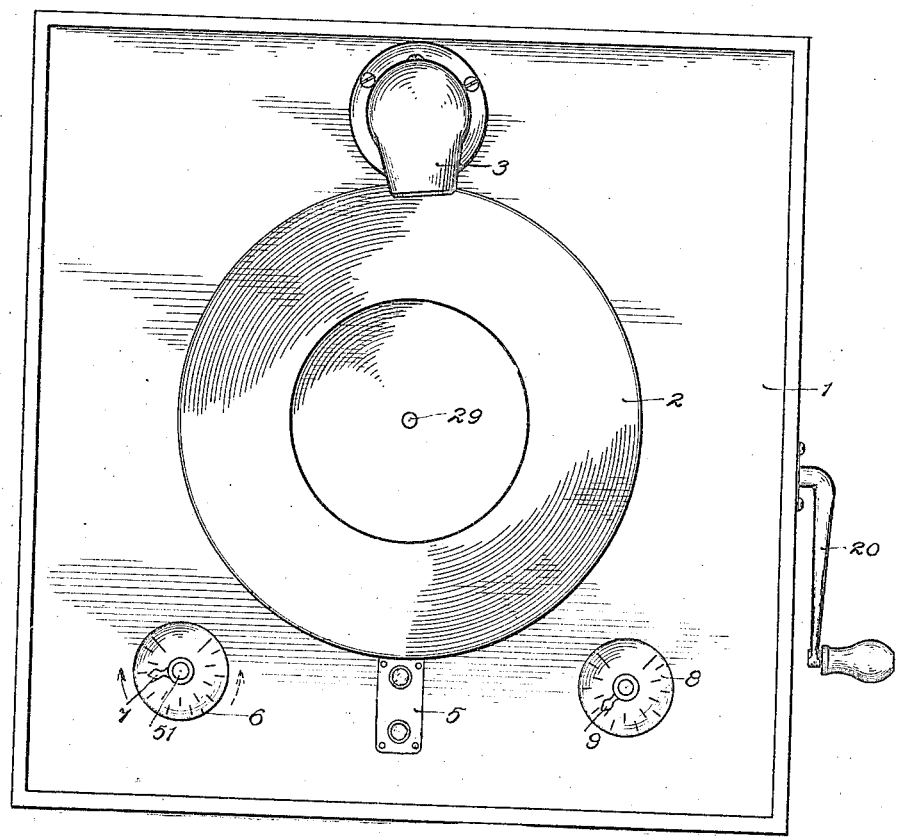
Figure 1 is a plan view of a phonograph with the usual cover removed.

Referring to the drawings, the reference character 1 indicates the top of a phonograph casing, above which the turntable 2 is rotatably mounted. The reference character 3 indicates the usual tone arm, the reproducing apparatus not being illustrated. At 5 is illustrated the starting and stopping mechanism. The reference character 6 indicates a dial having suitable indicia thereon for indicating when the motor is fully wound and when it is run down, and intermediate graduations to indicate the extent between these two limits to which the spring is wound, a suitable pointer 7 co-acting with the dial to indicate the conditions of the spring just referred to. The reference character 8 indicates a dial having suitable graduations with which the pointer 9 co-acts to indicate the speed of the turntable.

Referring to Figs. 2 to 5 inclusive the reference characters 10 indicate two spring barrels which are rotatably mounted upon a floating shaft 11, which in turn is rotatably mounted in the upper and lower bearing plates 12 and 13 respectively, as shown in Fig. 4. Spiral springs 14 are mounted in the spring barrels and have their inner ends hooked over lugs 15 formed integral with the shaft 11, and their outer ends secured to the walls of the spring barrels by means of rivets 16 or any other suitable devices. It will be noted that the two springs are coiled in opposite directions. The upper spring barrel is provided at its lower side with a spur gear 17, which meshes with a crown gear 18 on the winding shaft 19. The winding shaft 19 is provided with a detachable handle 20 shown in Fig. 1, by means of which it can be rotated. The numeral 21 indicates in general a detent mechanism for holding the shaft in the position to which it is turned for winding the spring system of the motor. As the details of this mechanism form no part of my present invention they will not be described in detail. From the above description it will be apparent that when the winding shaft 19 is rotated in the direction of the arrow in Fig. 4, both coils of the spring system will be wound up.

At 22 I have shown a spacing ring for spacing the two spring barrels from each other, and at 23 and 23' spacing collars surrounding the shaft 11 for separating the spring barrels from the bearing plates.

Secured to the lower side of the lower spring barrel is a spur gear 24, which meshes with a pinion 25 upon the idler shaft 26. The idler shaft 26 carries a spur gear 27, which meshes with a pinion 28 secured to the turntable shaft 29. The upper end of the turntable shaft 29 has a clutch member 30 which is received in a slot (not shown) in the turntable to establish a driving connection between the shaft and the turntable. The gear train just described provides the necessary connections between the spring motor and the turn table for rotating the latter.

The means for indicating the extent to which the spring is wound are illustrated in Figs. 2, 3, and 5, and comprise the oppositely inclined worms 31 and 32 formed on the upper and lower spring barrels respectively. These worms engage with worm pinions 33 and 34 respectively, which are mounted on the shafts 35 and 36. The ends of the shafts 35 and 36 are rotatably supported in the bearing brackets 37 and 38, which are formed integral with the bridges 39 and 40 respectively. The ends of these bridges, as shown in Fig. 3, are secured to the upper and lower bearing plates 12 and 13 respectively by means of screws 41. The bridges are connected at each end by looped spacing members 42. The pinions 33 and 34 mesh with the spur gears 43 and 44 respectively, which are formed integral with the bevel differential gears 45 and 46 respectively. The gears 43 and 44 and the differential gears 45 and 46 are rotatably mounted upon a dial shaft, which comprises the rigid portion 47 and the flexible portion 48, which are united by a suitable coupling 49. The free end of the flexible portion 48 is turned upwardly as shown in Fig. 2, and connected with a rigid portion 51, which extends through the bearing plate 50, and to the upper end of which the pointer 7 is rigidly connected. Secured to the rigid portion 47 of the dial shaft intermediate the gears 45 and 46 is a collar 52, which serves to space the gears 45 and 46 and which carries a stub shaft 53, on the outer end of which is rotatably mounted the bevel differential pinion 54.

From the above description it will be clear that during the winding operation, if the turntable is stationary the lower spring barrel will remain stationary, but the upper spring barrel will be rotated in a clockwise direction. This motion of the upper spring barrel is communicated through the pinion 33, gear 43, to the differential gear 45 to rotate this gear in the direction indicated by the arrow in Fig. 5. This will cause the differential pinion 54 to roll upon the differential gear 46 in the same direction an amount which is proportional to the extent to which the spring is wound, thereby causing the pointer 7 to travel in the direction of the arrow shown in full lines in Fig. 1. After the spring has been wound to its full wound position, as indicated by the pointer 7, the phonograph may be unwound for rotating the records in the usual manner. As the spring unwinds to rotate the turntable the upper spring barrel 10 will be held stationary and the lower spring barrel 10 will rotate in the same direction that the upper barrel was rotated in winding the spring system. This movement of the lower spring barrel is communicated to the differential gear 46 through the worm 32, the pinion 34 and the gear 44 to rotate the differential gear 46 in the direction of the arrow shown in Fig. 5. This movement of the gear 46 will cause the differential pinion 54 to roll in the same direction upon the differential gear 45, thereby causing the pointer 7 to rotate in the direction indicated by the arrow shown in dotted lines in Fig. 1. The extent of movement of the differential pinion will of course be proportional to the extent to which the spring system is unwound.

As a result of the two movements of the pinion 54 described above, the pointer 7 will always indicate the exact extent to which the spring is wound. Due to the fact that I employ a differential movement for moving the pointer 7, the latter will always indicate the extent to which the spring is wound, even though the spring is wound up while the motor is running.

While I have illustrated certain means for governing the speed of the motor and for regulating the speed thereof, I will not describe these means in detail, as they form no part of my present invention, and for the further reason that any of the many means now employed for this purpose may be used with the invention described and claimed in this application.

While I have described the preferred embodiment of my improvement in phonographs in detail, it is to be understood that it is capable of other adaptations and modifications within the scope of the appended claims, and it is to be especially understood that the means I have described and illustrated for indicating the extent to which the spring of a spring motor is wound up is capable of being used in connection with any spring motor or motor which is provided with means for storing up energy in a potential form.

Having thus described my invention, what I claim as new and desire to secure by Letters Patent of the United States is:

1. A spring motor comprising a floating shaft, a pair of spring barrels rotatably mounted on said shaft and containing springs coiled in opposite directions, the inner ends of said springs being secured to the said shaft and the outer ends to said barrels, a winding mechanism geared to one of said barrels, a turntable shaft geared to the other barrel, a worm formed on the periphery of each of said barrels, the said worms being inclined in opposite directions, a dial shaft, a pair of differential gears rotatably mounted on said dial shaft, a differential pinion secured to said dial shaft and meshing with said gears, gears secured to said differential gears and meshing with said worms, a dial, and a pointer secured to said dial shaft and traveling over said dial.

2. The combination with a spring motor comprising a shaft rotatably mounted on a suitable support, a pair of spring barrels rotatably mounted on said shaft, and a spiral spring in each of said barrels having its inner end secured to said shaft and its outer end to said barrel, the said springs being coiled in opposite directions, of a dial, a dial shaft, a pointer mounted on said shaft in co-acting relation with said dial, a differential pinion secured to said shaft, a pair of differential gears meshing with opposite sides of said pinion, and gear connections between said barrels and said gears for rotating the gears in opposite directions.

3. The combination with a spring motor comprising a shaft rotatably mounted on a suitable support, a pair of spring barrels rotatably mounted on said shaft, and a spiral spring in each of said barrels having its inner end secured to said shaft and its outer end to said barrel, the said springs being coiled in opposite directions, of a dial, a dial shaft, a pointer mounted on said shaft in co-acting relation with said dial, a pinion secured to said shaft, and positive gear connections between said barrels and said pinion for rotating said pinion in opposite directions during the winding and unwinding operations respectively of said spring.

4. In a spring motor, the combination with spring driving means, of a pair of casings surrounding said spring driving means, one of said casings being secured to said spring to rotate therewith during the winding operation and the other of said casings being connected with said spring driving means to rotate therewith when said motor is functioning as a driving means, worms formed on the outer periphery of said casings, a dial, an index movable over said dial, means for moving said index comprising a flexible shaft and a differential gear mechanism for driving said shaft, said gear mechanism being driven by the worms on said casings.

5. A spring motor comprising a spring driving means, means for winding said spring, a worm driven by said winding means, means driven by said spring driving means, a worm driven by said last named means, means for differentiating the movements of said worms, and means actuated by said differentiating means for indicating the difference in movements of said worms.

In witness whereof, I hereunto subscribe my name this 10th day of January, 1918.

ARTHUR V. GULLBORG.

Witnesses:
 MARY A. COOK,
 LAMAR I. MIDDLETON.

Copies of this patent may be obtained for five cents each, by addressing the "Commissioner of Patents, Washington, D. C."